United States Patent
Sasaki et al.

(10) Patent No.: US 7,199,506 B2
(45) Date of Patent: Apr. 3, 2007

(54) PIEZOELECTRIC ACTUATOR FOR DRIVING LENS

(75) Inventors: Ryota Sasaki, Saitama (JP); Tomonari Masuzawa, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/148,358

(22) Filed: Jun. 9, 2005

(65) Prior Publication Data

US 2005/0275314 A1  Dec. 15, 2005

(30) Foreign Application Priority Data

Jun. 11, 2004  (JP)  ............................. 2004-174187

(51) Int. Cl.
*H01L 41/09* (2006.01)
*G02B 7/08* (2006.01)

(52) U.S. Cl. .................................. 310/328; 310/323.17

(58) Field of Classification Search ........... 310/323.17, 310/323.01, 323.02, 328
See application file for complete search history.

(56) References Cited

U.S. PATENT DOCUMENTS

| 5,225,941 | A | 7/1993 | Saito et al. ................. 359/824 |
|---|---|---|---|
| 5,890,391 | A | 4/1999 | Okada ......................... 74/128 |
| 6,091,552 | A | 7/2000 | Ueyama ...................... 359/694 |
| 6,188,161 | B1 * | 2/2001 | Yoshida et al. ............. 310/328 |
| 6,320,298 | B1 | 11/2001 | Kawabe ....................... 310/317 |
| 6,392,827 | B1 | 5/2002 | Ueyama et al. ............. 359/824 |
| 2002/0030422 | A1 | 3/2002 | Hata ..................... 310/323.17 |

FOREIGN PATENT DOCUMENTS

| EP | 0 464 764 A1 | 1/1992 |
|---|---|---|
| JP | 04-069070 A | 3/1992 |
| JP | 10-232337 A | 9/1998 |

* cited by examiner

*Primary Examiner*—Darren Schuberg
*Assistant Examiner*—J. Aguirrechea
(74) *Attorney, Agent, or Firm*—Birch, Stewart, Kolasch & Bitch, LLP

(57) ABSTRACT

An actuator of the present invention comprises a piezoelectric element, one end face of the piezoelectric element in a displacement direction being supported by a fixing member, a block shaped driving member attached to the other end face of the piezoelectric element in the displacement direction, and a driven member frictionally engaged with at least one end face of the driving member in a direction orthogonal to the displacement direction, the driven member being extended along the displacement direction.

4 Claims, 6 Drawing Sheets

PIEZOELECTRIC ACTUATOR FOR DRIVING LENS

BACKGROUND OF THE INVENTION

1. Field of the Invention

The present invention relates to an actuator, and more particularly to an actuator which is installed in compact precision instruments such as a digital camera and a portable telephone, and which drives a zoom lens and a focus lens.

2. Related Art

Drives in a lens section of a digital camera, etc. include an actuator using a piezoelectric element. For example, an actuator disclosed in Japanese Patent No. 2633066 has a driving rod which is fixed to an end face of a piezoelectric element, and which slidably supports a lens barrel. A leaf spring is attached to the lens barrel so that a frictional force is applied between the driving rod and the lens barrel by the resilient force of the leaf spring. In addition, approximately sawtooth-shaped driving pulses are applied to the piezoelectric element, which is displaced with different velocities in the expanding direction and in the contracting direction. For example, when the piezoelectric element is slowly displaced, the lens barrel is moved with the driving rod. On the other hand, when the piezoelectric element is displaced fast, the lens barrel is stopped at the same position by the inertia of the mass of itself. Accordingly, the lens barrel can be intermittently moved at fine pitches by repeatedly applying the approximately sawtooth-shaped driving pulses to the piezoelectric element.

An actuator disclosed in Japanese Patent Application Laid-open No. 10-232337 has an engaging member attached to an end face of a piezoelectric element in the displacement direction, and the engaging member is frictionally engaged with a moving plate to which a lens barrel is attached. The engaging member is then made to vibrate so as to allow the moving plate and the lens barrel to move, by applying driving pulses to the piezoelectric element.

SUMMARY OF THE INVENTION

However, since in the actuators disclosed in Japanese Patent No. 2633066 and Japanese Patent Application Laid-open No. 10-232337, driving members (the above described driving rod and engaging member, etc.) are formed in a rod shape or a plate shape, there is a problem that the vibration of the piezoelectric element is absorbed by the driving member so that the lens barrel can not be accurately moved. Since the high frequency vibration has a large attenuation factor due to the driving member, there is a problem that the response characteristic of the lens barrel is worsened so that the lens barrel cannot be accurately moved.

In the actuators disclosed in Japanese Patent No. 2633066 and Japanese Patent Application Laid-open No. 10-232337, there is also a problem that the frictional force between the driving member and the driven member is insufficient so that the operation of the driven member tends to become unstable.

The present invention has been made in view of the above described circumstances. An object of the present invention is to provide an actuator capable of stably and accurately moving the driven member.

In order to achieve the above described object, a first aspect of the present invention is an actuator comprising: a piezoelectric element whose one end face in its displacement direction is supported by a fixing member; a block shaped driving member attached to the other end face of the piezoelectric element in the displacement direction; and a driven member which is frictionally engaged with at least one end face of the driving member in a direction orthogonal to the displacement direction, and which is extended along the displacement direction.

According to the first aspect of the present invention, the driving member is formed in a block shape and hence the vibration of the piezoelectric element can be transmitted to the driven member without being attenuated by the driving member, as a result of which the driven member can be accurately moved.

A second aspect according to the present invention is characterized in that in the first aspect, the driven member is frictionally engaged with both end faces of the driving member in a direction orthogonal to the displacement direction. According to the second aspect, since the driven member is frictionally engaged with both end faces of the driving member, the frictional engagement surface is increased and a large output can be obtained, thereby enabling the driven member to be stably and accurately moved. Specifically, the provision of the frictional engagement surface for both end faces of the driving member prevents the driving force from being non-uniformly transmitted to the driven member, thereby enabling the driven member to be stably and accurately moved.

A third aspect according to the present invention is characterized in that in the first or second aspect, the actuator is a lens moving actuator for moving a lens frame attached to the driven member along an optical axis.

In the actuator according to the present invention, since the driving member is formed in a block shape, the vibration of the piezoelectric element is transmitted to the driven member without being attenuated by the driving member, as a result of which the driven member can be accurately moved.

DETAILED DESCRIPTION OF THE PREFERRED EMBODIMENTS

Figure 1:
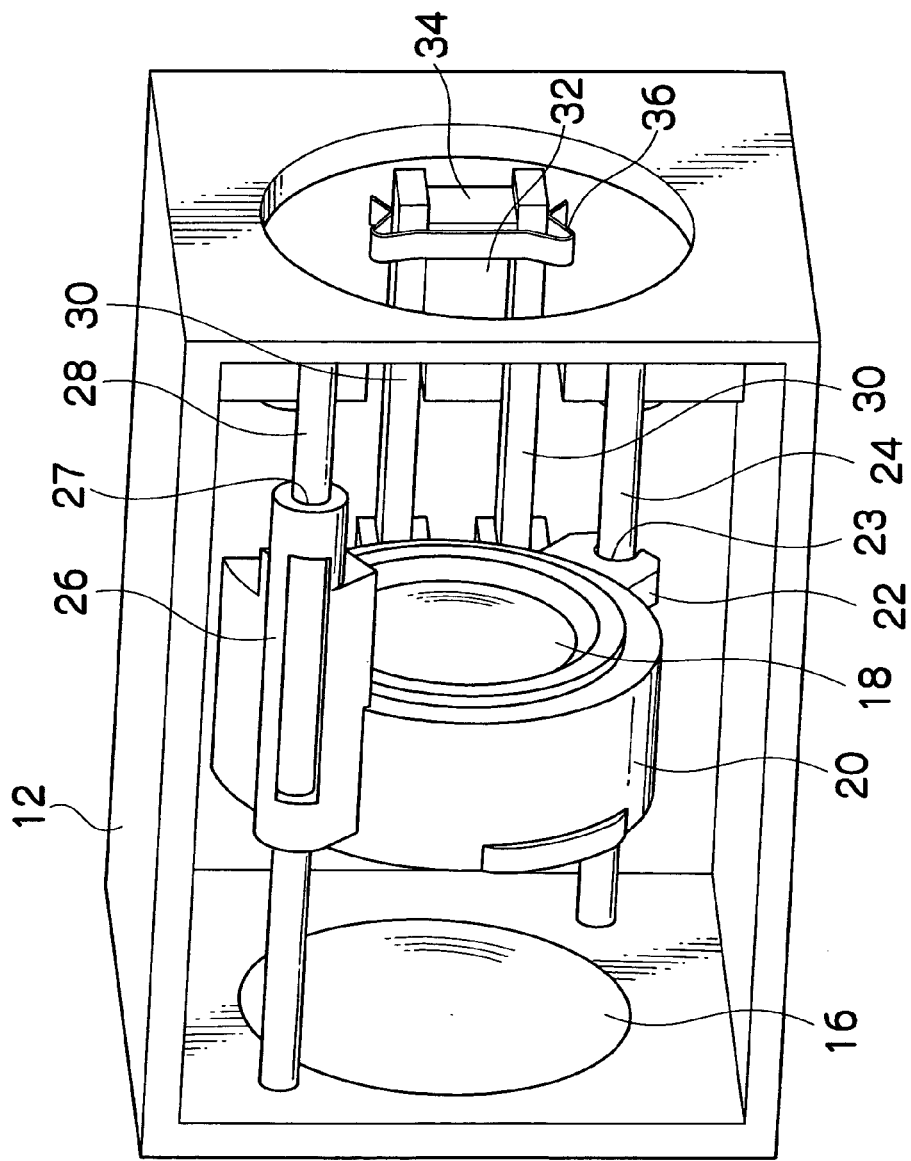
FIG. 1 is an exploded perspective view showing a configuration of a lens device to which an actuator according to the present invention is applied.

In the following, preferred embodiments of the actuator according to the present invention are described with reference to the accompanying drawings. FIG. 1 is a perspective view showing a configuration of a lens device to which the actuator of the present invention is applied. The lens device shown in FIG. 1 has a box-shape case 12, to a side face of which a fixed lens 16 is attached. A lens frame 20 holding a moving lens (for example, a zoom lens and a focus lens) 18 is provided in the case 12.

An engaging portion 22 and a guide portion 26 are formed to project on the external peripheral surface of the lens frame 20. The engaging portion 22 is formed with a U-shaped groove 23 which engages a guide rod 24. The guide portion 26 is formed with a through-hole 27, to which a guide rod 28 is inserted. The guide rods 24, 28 are arranged in a direction of an optical axis, and are fixed to the case 12. Thereby, the lens frame 20 is slidably supported in the direction of the optical axis.

Figure 2:
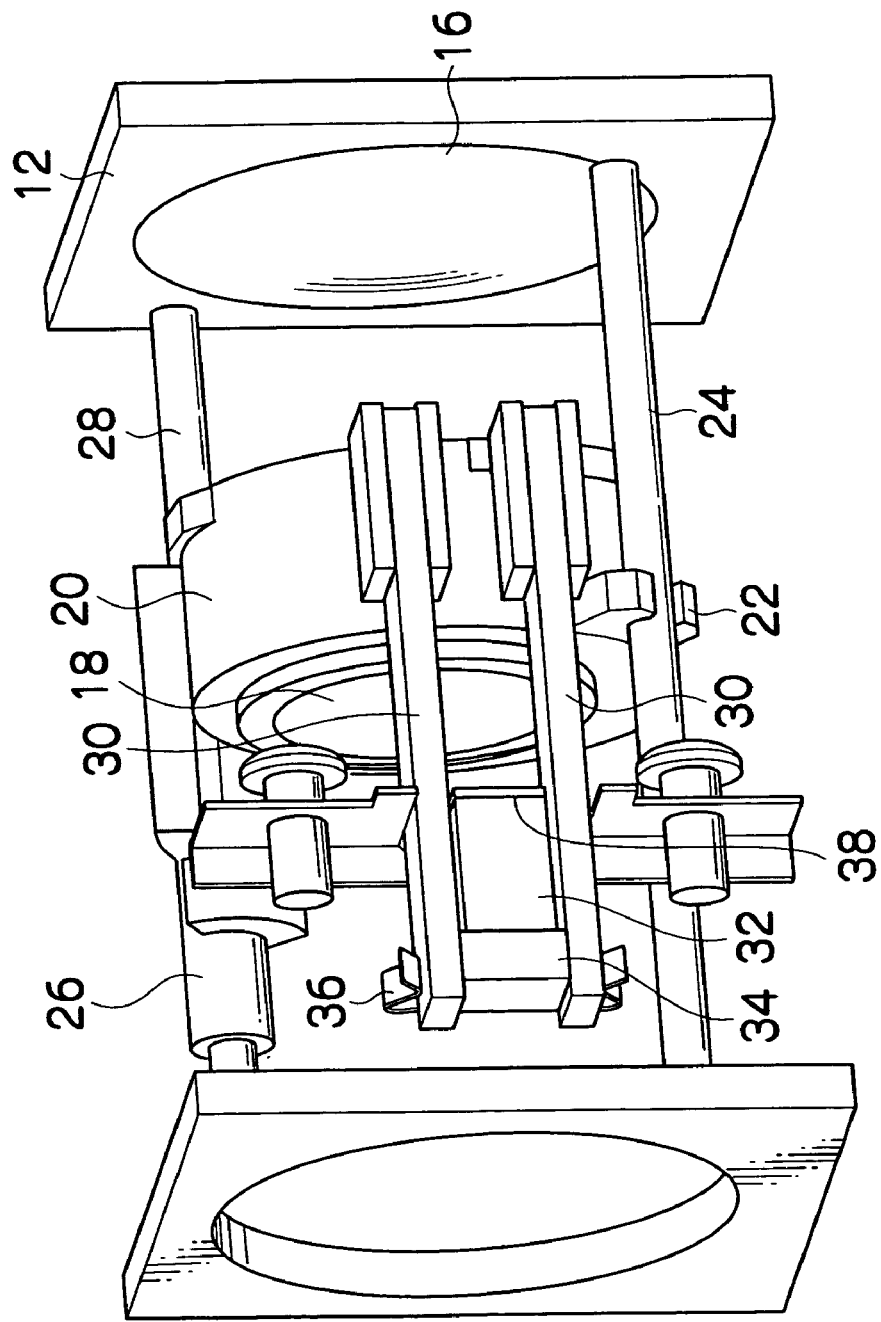
FIG. 2 is a perspective view showing a configuration of an actuator according to a present embodiment.

Two driven plates (corresponding to the driven members) 30 are integrally attached to the lens frame 20. Each of the driven plates 30 is formed in an elongated rectangular shape as shown in FIG. 2, and is arranged so as to make its longitudinal direction become in parallel with the optical axis. The driven plates 30 are arranged so as to become in parallel with each other, the interspace between which driven plates is determined corresponding to the width of a driving member 34, as will be described below. As the material of the driven member 30, which is not specifically limited, a material which is light and strong in rigidity, for example a ceramic, etc. is chosen.

The actuator according to the present embodiment is provided with a piezoelectric element 32 and the driving member 34 which are arranged between the two driven plates 30. The piezoelectric element 32, whose width size (the vertical dimension in FIG. 2) is formed to be smaller than the interspace between the driven plates 30, is arranged to have some clearances from the driven plates 30. A pressing plate 38 fixed to the case 12 is arranged on one end face of the piezoelectric element 32 in the displacement direction (optical axis direction), and the driving member 34 is arranged on the other end face of the piezoelectric element 32. The driving member 34 is formed in a rectangular block shape, and is made of a material which is light and strong in rigidity, for example a ceramic, as in the driven plate 30. The driving member 34, whose width size (the vertical dimension in FIG. 2) is formed to be larger than the width size of the piezoelectric element 32, is formed to have approximately the same size as the interspace between the driven plates 30.

A press spring 36 is attached to the driven plates 30. The press spring 36 is attached so as to sandwich the driven plates 30, which are respectively pressed to the top face and the bottom face of the driving member 34 by the resilient force of the press spring 36. Thereby, each of the driven plates 30 frictionally engages the top face and the bottom face of the driving member 34, respectively. The frictional force between the driven plate 30 and the driving member 34, as will be described below, is set such that the frictional force is larger than a driving force generated when a driving pulse with a slow voltage variation is applied to the piezoelectric element 32, and that the frictional force is smaller than a driving force when a driving pulse with an abrupt voltage variation is applied to the piezoelectric element 32.

Figure 3A:
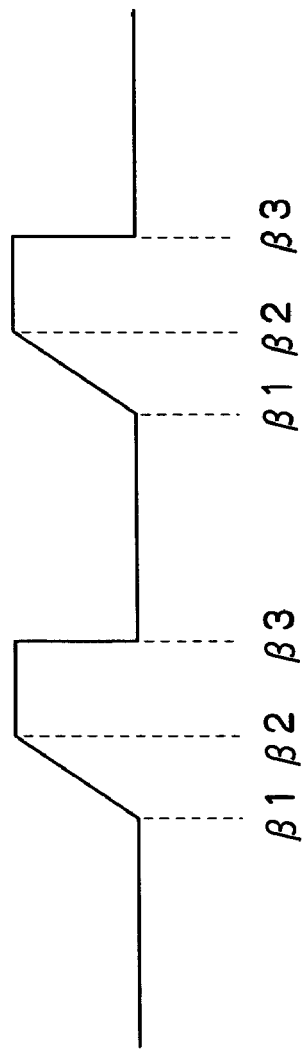
FIGS. 3A and 3B are waveform charts of driving pulses applied to a piezoelectric element in FIG. 2.
Figure 3B:
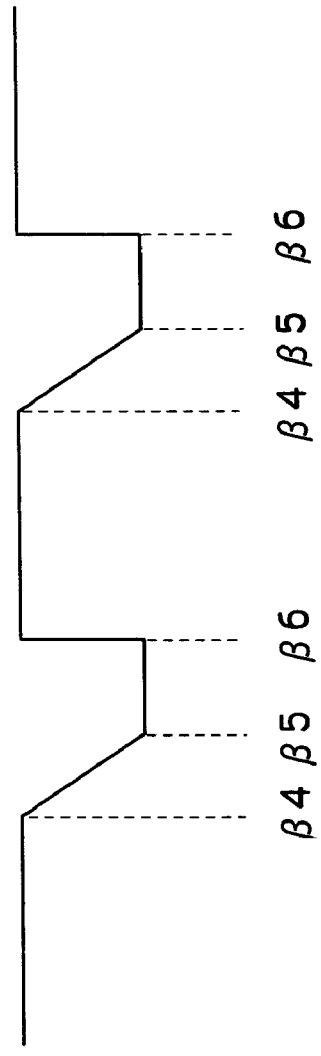

FIG. 3A and FIG. 3B show examples of the driving pulses applied to the piezoelectric element 32. FIG. 3A is the driving pulse at the time of moving the lens frame 20 in FIG. 2 in the left direction, and FIG. 3B is the driving pulse at the time of moving the lens frame 20 in FIG. 2 in the right direction.

As shown in FIG. 3A and FIG. 3B, approximately sawtooth-shaped drive pulses are applied to the piezoelectric element 32. For example, in the case of FIG. 3A, the piezoelectric element 32 is applied with approximately sawtooth-shaped drive pulses which gradually rise from the time $\beta1$ to the time $\beta2$, and which abruptly fall at the time $\beta3$. Thus, the piezoelectric element 32 slowly expands from the time $\beta1$ to the time $\beta2$, and in accordance with the expansion, the driving member 34 is gradually displaced so that the driven plates 30 move together with the driving member 34. Thereby, the driven plates 30 are moved in the left direction in FIG. 2. At the time $\beta3$, the piezoelectric element 32 abruptly contracts so that the driving member 34 is displaced in the right direction in FIG. 2. In this case, the driving member 34 is abruptly displaced so that only the driving member 34 is moved, while the driven plates 30 remain stopped due to the inertia of the driven plates. Accordingly, the repeated application of the approximately sawtooth-shaped drive pulses shown in FIG. 3A causes the driven plates 30 in FIG. 2 to repeat operations of a move and a stop in the left direction, thereby enabling the lens frame 20 to be moved in the left direction.

In the case of FIG. 3B, the piezoelectric element 32 is applied with approximately sawtooth-shaped drive pulses which gradually fall from the time $\beta4$ to the time $\beta5$, and which abruptly rise at the time $\beta6$. Thus, the piezoelectric element 32 slowly contracts from the time $\beta4$ to the time of $\beta5$, and in accordance with the contraction, the driving member 34 is gradually displaced so that the driven plates 30 move together with the driving member 34. Thereby, the driven plates 30 are moved in the right direction in FIG. 2. At the time $\beta6$ in FIG. 3B, the piezoelectric element 32 abruptly expands so that the driving member 34 is displaced in the left direction in FIG. 2. In this case, the driving member 34 is abruptly displaced so that only the driving member 34 is moved, while the driven plates 30 remain stopped due to the inertia of the driven plate. Accordingly, the repeated application of the approximately sawtooth-shaped drive pulses shown in FIG. 3B causes the driven plates 30 in FIG. 2 to repeat operations of a move and a stop in the right direction, thereby enabling the lens frame 20 to be moved in the right direction.

Next, an effect of the actuator configured as described above is explained.

A main feature of the actuator according to the present embodiment is that the driving member 34 is formed in a block shape. In the case where the driving member 34 is formed in a rod shape and a plate shape, the vibration of the piezoelectric element 32 tends to be absorbed by the driving member 34, which makes it extremely difficult to accurately drive the driven plate 30. In particular, the driven plates 30, when driven by a low voltage electromotive force and high frequency pulse signals, cannot be accurately driven.

On the other hand, when the driving member 34 is formed in a block shape, as in the present embodiment, the vibration of the piezoelectric element 32 may not be absorbed by the driving member 34. Further, the present embodiment is configured such that the driven plate 30 is extended in the driving direction, and that the position of the frictional engagement surface between the driving member 34 and the driven plates 30 is always kept constant with respect to the piezoelectric element 32, as a result of which the frictional engagement surface is always maintained in the vicinity of the piezoelectric element 32. Thus, since the vibration of the piezoelectric element 32 is transmitted to the driven plates 30 without being attenuated, the driven plate 30 can be accurately moved. Accordingly, even in the case where low voltage and high frequency drive pulses are applied, the lens frame 20 can be moved accurately and at a high speed.

Another main feature of the actuator according to the present embodiment is that the driven plates 30 are made to engage both sides of the driving member 34. As configured in this manner, a sufficient frictional force can be stably obtained and a frictional force which is equal in the upper and lower parts in the driving member 34 can also be obtained, so that the driving force can be equally and surely transmitted to the driven plates 30. On the contrary, when only one driven plate 30 is provided, there is a problem that a sufficient frictional force between the driven plate 30 and the driving member 34 can not be obtained, and that the frictional engagement surface provided only at one side of the driving member 34 causes a poor balance, as a result of which the driving force of the piezoelectric element 32 cannot be efficiently transmitted to the driven plate 30. Thus, according to the actuator of the present embodiment, the driven plates 30 are made to be frictionally engaged with both sides of the driving member 34, so that the driving force can be equally and surely transmitted to the driven plated 30, thereby enabling the lens frame 20 to be moved smoothly.

Figure 4:
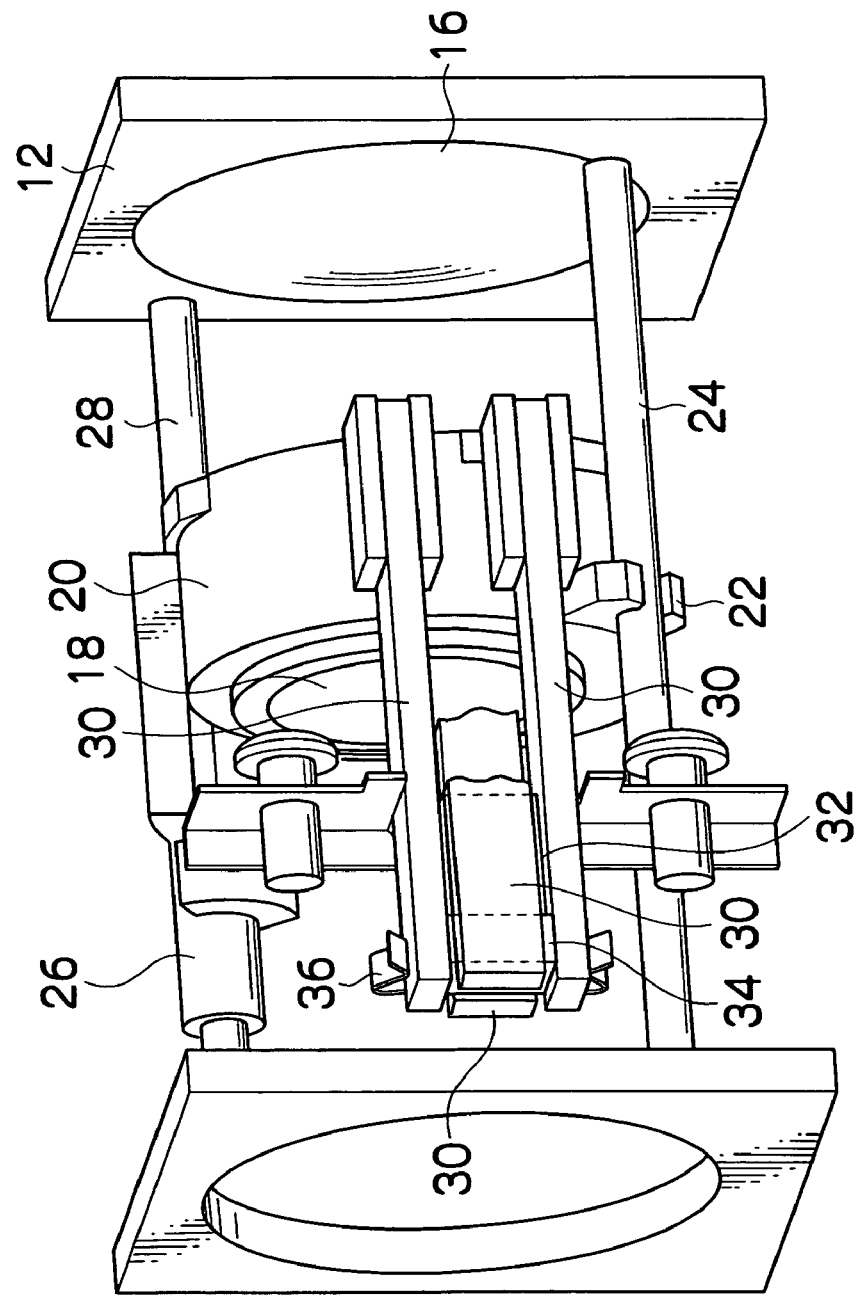
FIG. 4 is a perspective view showing an actuator having a configuration different from that shown in FIG. 2.

In the above described embodiment, two driven plates 30 are made to be frictionally engaged with both sides of the driving member 34, but more than two driven plates 30 may also be made to be frictionally engaged. For example, FIG. 4 shows an example in which four driven plates 30, . . . , are provided. Each of the driven plates 30 shown in FIG. 4, which are formed in an elongated rectangular form, is arranged so as to make the longitudinal direction of the elongated rectangular form become the optical axis direction, and is fixed to the lens frame 20. Each of the driven plates 30, which are arranged so as to surround the driving member 34, is also made to be frictionally engaged with each side face of the driving member 34. Thus, the frictional force can be increased by making the respective four driven plates 30, . . . , frictionally engaged with each side face of the driving member 34, thereby enabling the lens frame 20 to be moved more stably. The driving force of the piezoelectric element 32 can also be transmitted equally in the four directions (upper, lower, left, right directions), thereby enabling the lens frame 20 to be moved more smoothly.

Figure 5:
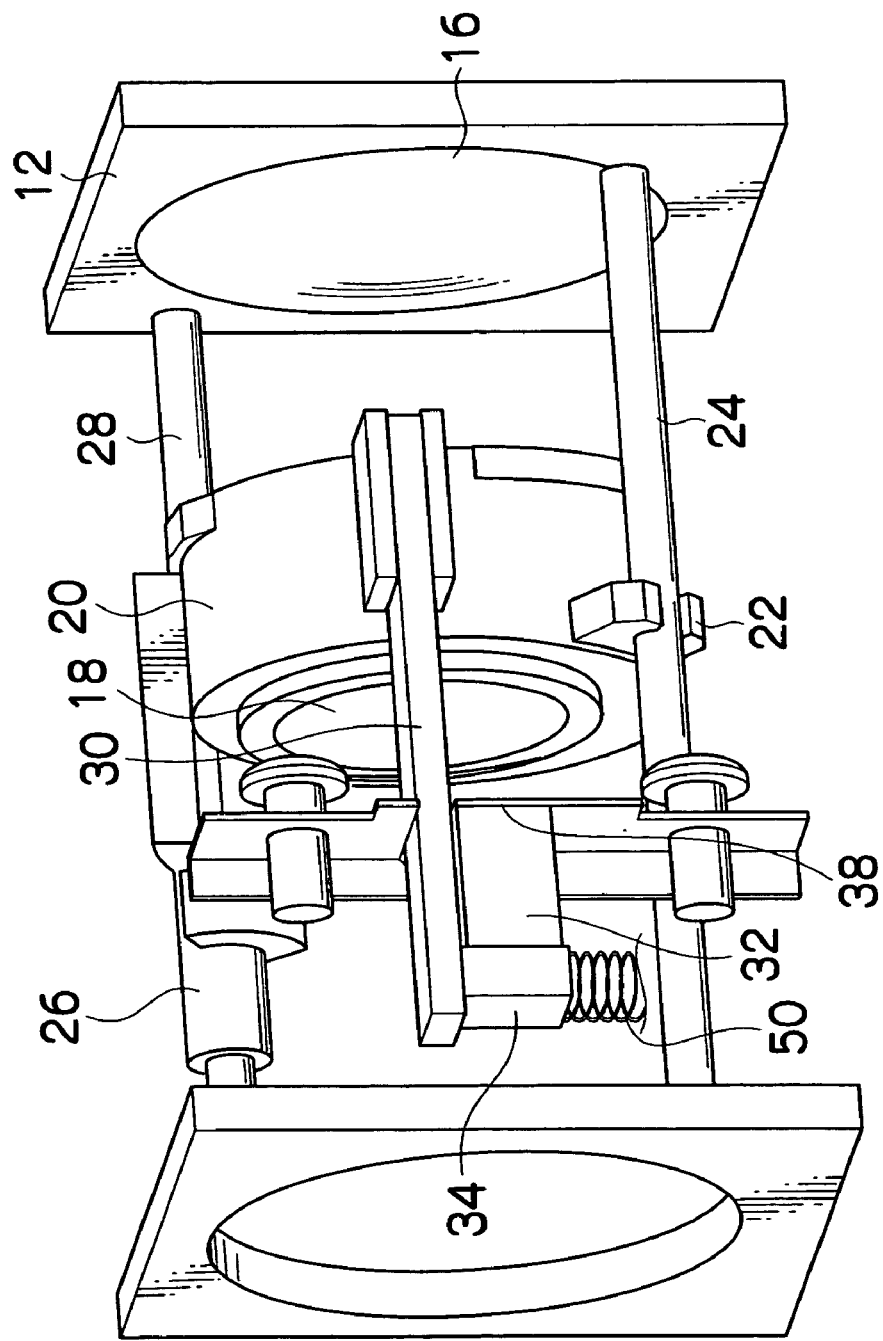
FIG. 5 is a perspective view showing an actuator having a configuration different from that shown in FIG. 2.

As shown in FIG. 5, the driven member 30 may be provided at only one side of the driving member 34. The driving member 34 in FIG. 5 is pressed against the driven member 30 by an urging device formed by a compression spring 50. The compression spring 50 has a lower end (not shown) which is fixed to the case 12, and an upper end which is made to abut the driving member 34, so that the frictional force between the driving member 34 and the driven member 30 is ensured by the urging force of the compression spring 50. Thus, even in the case where the driven plate 30 is provided at only one side of the driving member 34, the vibration of the piezoelectric element 32 can be prevented from being attenuated, by forming the driving member 34 in a rectangular block shape, as a result of which the drive control of the driven plate 30 can be accurately performed.

Figure 6:
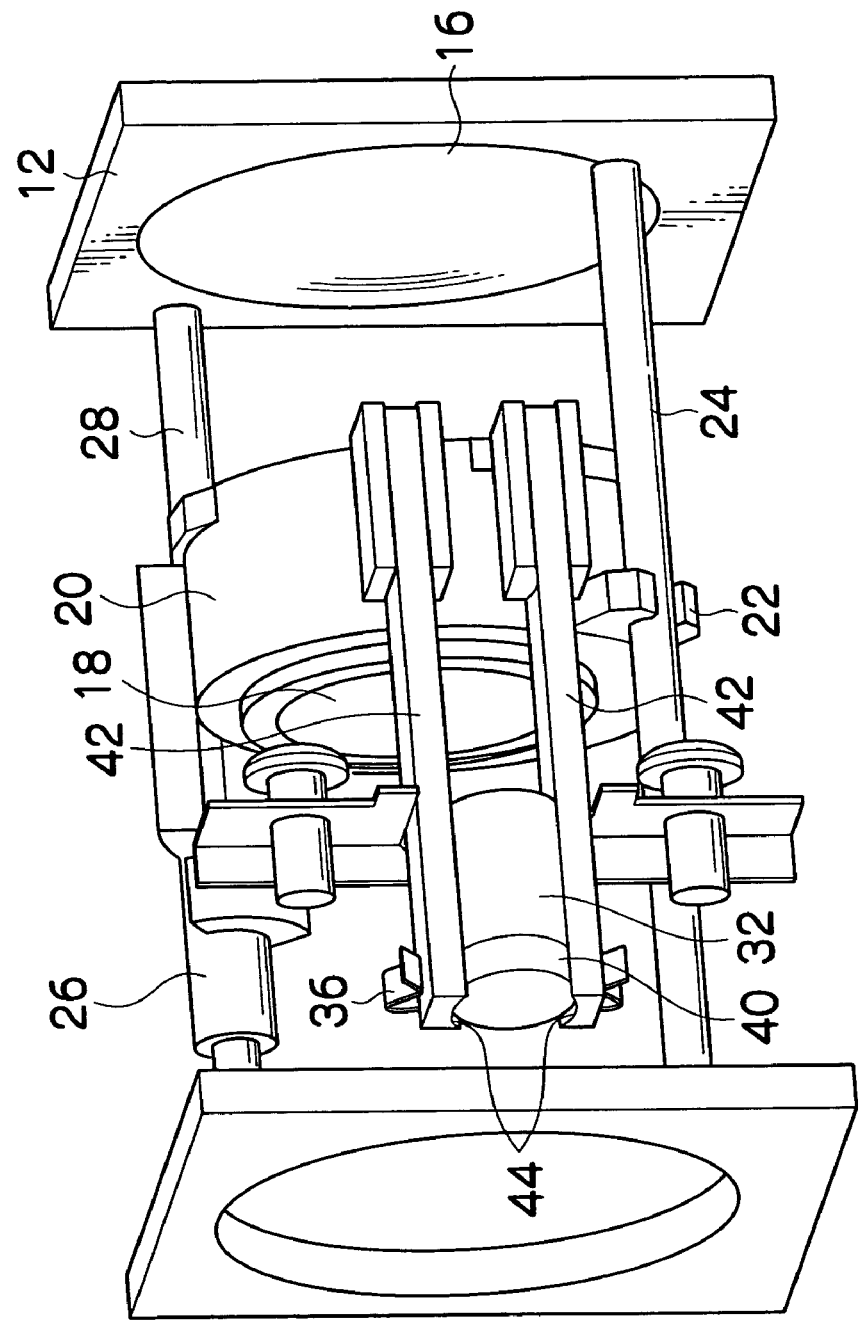
FIG. 6 is a perspective view showing an actuator having a configuration different from that shown in FIG. 2.

In the above described embodiments, the plate shaped driving member 34 is used, but the present invention is not limited to the embodiments described above, and for example, a cylindrical driving member 40 may also be used as shown in FIG. 6. In this case, it is preferred that the driven plates 42 are formed with grooves 44 in a circular arc shape in the driving direction, so as to make the driving member 40 frictionally engaged with the grooves 44. Also in this case, the frictional force between the driven plates 42 and the driving member 40 can be sufficiently and stably secured by making the driven plates 42 frictionally engaged with both sides of the driving member 40, thereby enabling the driven members 42 to be moved smoothly and stably.

A triangular prism-shaped driving member may also be used, and in this case, the rattling between the driving member and the driven member can be prevented by making two side faces of the driving member frictionally engaged with the driven member.

As for an application of the actuator according to the present invention, the actuator can be applied to compact precision instruments, for example, a digital camera and a portable phone, etc. The portable phone, which needs to be operated with a low voltage not more than 3 V, can be driven even at a high frequency of about 20 kHz by using the actuator according to the present invention, so that the lens frame 20 can be moved at a high speed no less than 2 mm/s. Thereby, even in a zoom lens which needs a displacement about 10 mm, the displacement can be effected promptly.

What is claimed is:

1. An actuator, comprising:
    a piezoelectric element, one end face of the piezoelectric element in a displacement direction being supported by a fixing member;
    a rectangular-sided block shaped driving member attached to the other end face of said piezoelectric element in the displacement direction; and
    driven members frictionally engaged with surfaces of both sides of said driving member by an elastic force of a spring member in a direction orthogonal to said displacement direction, the driven member being extended along said displacement direction.

2. The actuator according to claim 1, wherein said driven members are frictionally engaged, respectively, with flat surfaces on opposite sides of said driving member.

3. The actuator according to claim 1, wherein said actuator is a lens moving actuator for moving a lens frame attached to said driven member along an optical axis.

4. The actuator according to claim 2, wherein said actuator is a lens moving actuator for moving a lens frame attached to said driven member along an optical axis.

* * * * *